(12) United States Patent
Chen et al.

(10) Patent No.: US 10,207,627 B2
(45) Date of Patent: Feb. 19, 2019

(54) ANTI-SLIP SAFETY TENSIONING DEVICE FOR AUTOMOBILE

(71) Applicant: NINGBO XULI METAL PRODUCTS CO., LTD, Ningbo (CN)

(72) Inventors: Weiguo Chen, Ningbo (CN); Yanqiong Chen, Ningbo (CN); Fengquan Ma, Ningbo (CN)

(73) Assignee: Ningbo Xuli Metal Products Co., Ltd., Ningbo (CN)

( * ) Notice: Subject to any disclaimer, the term of this patent is extended or adjusted under 35 U.S.C. 154(b) by 436 days.

(21) Appl. No.: 15/109,787

(22) PCT Filed: Jan. 20, 2016

(86) PCT No.: PCT/CN2016/000035
§ 371 (c)(1),
(2) Date: Jul. 5, 2016

(87) PCT Pub. No.: WO2016/127725
PCT Pub. Date: Aug. 18, 2016

(65) Prior Publication Data
US 2018/0194269 A1   Jul. 12, 2018

(30) Foreign Application Priority Data

Feb. 12, 2015   (CN) .......................... 2015 1 0074040

(51) Int. Cl.
*B60P 7/08* (2006.01)
*B60P 7/06* (2006.01)
*B65H 59/00* (2006.01)

(52) U.S. Cl.
CPC .............. *B60P 7/0838* (2013.01); *B60P 7/06* (2013.01); *B65H 59/00* (2013.01); *Y10T 24/2175* (2015.01)

(58) Field of Classification Search
CPC ...... Y10T 24/2175; B60P 7/0838; B60P 7/06; B65H 59/00
See application file for complete search history.

(56) References Cited

U.S. PATENT DOCUMENTS 6,158,092 A * 12/2000 Huang .................. B60P 7/0838
24/68 CD
6,631,537 B1 * 10/2003 Huang .................. B60P 7/0838
24/171
8,291,552 B2 * 10/2012 Gopal .................. A44B 11/125
24/68 CD

* cited by examiner

*Primary Examiner* — Abigail E Troy
(74) *Attorney, Agent, or Firm* — Wang Law Firm, Inc.

(57) ABSTRACT

An anti-slip safety tensioning device for automobile, comprises a driving handle assembly, an eccentric shaft, a support assembly, a long band and a short band; wherein, the driving handle assembly is located between a pair of support lateral plates of the support assembly, and can be rotatable relative to the eccentric shaft; and when the driving handle assembly is folded, the eccentric shaft is located on a rear side of the top shaft and the eccentric bulge of the eccentric shaft faces the top shaft; the long band having a free end wrapped around the eccentric shaft, and the free end passes through the gap between the eccentric shaft and the top shaft. When in unfolded state, there is a largest gap between the top shaft and the eccentric shaft.

6 Claims, 5 Drawing Sheets

ANTI-SLIP SAFETY TENSIONING DEVICE FOR AUTOMOBILE

RELATE APPLICATIONS

This application is a national phase entrance of and claims benefit to PCT Application for an anti-slip safety tensioning device for automobiles, PCT/CN2016/000035, filed on Jan. 20, 2016, which claims benefit to Chinese Patent Applications 201510074040.5, filed on Feb. 12, 2015. The specifications of both applications are incorporated here by this reference.

FIELD OF THE INVENTION

The present invention relates to a safety tensioning device which can be convenient for tensioning and fixing cargos, in particular to an anti-slip safety tensioning device, which is applicable to aviation, sea transportation, automobiles, trucks, trailers, motorcycles, etc.

DESCRIPTION OF THE PRIOR ART

A safety tensioning device is generally made up of a tensioning device main body, a long band, a short band, etc. By using an existing safety tensioning device, cargos can be tightly tensioned in the beginning, and the transportation safety of cargos can be efficiently ensured. However, during long-distance transportation, due to bumps and vibrations and other factors, a safety tensioning device, particularly a safety tensioning device for aviation, is greatly influenced by the weather and the air pressure. The tensioned cargos are subjected to resonance so that the tensioning woven tapes slide within the tensioning device, and as a result, the cargos are not fully tensioned. This will have a certain impact on the tensioning safety of cargos and there are potential hazards of safety accidents.

SUMMARY OF THE INVENTION

The technical problem to be solved by the present invention is to, in view of the prior art, provide an anti-slip safety tensioning device for automobile, which is simple in structure and convenient in operation, and can avoid the loosening of cargos during transportation and improve the transportation safety of cargos.

To solve the technical problem mentioned above, the anti-slip safety tensioning device for automobile comprises a driving handle assembly, a support assembly, a long band and a short band; wherein, the driving handle assembly is rotatable relative to the support assembly;

the support assembly comprises a pair of support lateral plates, an eccentric shaft having an eccentric bulge and two ends respectively inserted into the two support lateral plates, and a plurality of connecting shafts disposed between the two support lateral plates; the driving handle assembly comprises a pair of driving handle lateral plates, a top shaft located at a front side of the driving handle assembly and between two driving handle lateral plates, and a barrier assembly located at a rear side of the driving handle assembly and between two driving handle lateral plates; the driving handle assembly is located between the two support lateral plates, and the two ends of the eccentric shaft respectively pass through the two driving handle lateral plates enabling the whole driving handle assembly be rotatable around the eccentric shaft to achieve unfolding and folding of the driving handle assembly relative to the support assembly; and when the driving handle assembly is folded relative to the support assembly, the eccentric shaft is located on a rear side of the top shaft and the eccentric bulge of the eccentric shaft faces the top shaft; the long band having a free end wrapped around the eccentric shaft, and the free end of the long band passes through the gap between the eccentric shaft and the top shaft.

Preferably, the barrier assembly include a connecting barrier and a fixed plate disposed adjacent to each other and between the two driving handle lateral plates, and a spring disposed between the connecting barrier and the fixed plate; the connecting barrier has two stopper portions disposed at opposite sides thereof, and correspondingly, each support lateral plate has a slot for receiving each stopper portion, the two stopper portions and the slots of the two support lateral plates forms a locking mechanism between the connecting barrier and the two support lateral plates of the support assembly, when each stopper portion inserts into a corresponding slot, the driving handle assembly is locked with the support assembly.

Preferably, each end of the eccentric shaft has two steps defining two vertical step surfaces and a transverse step surface between the two vertical step surfaces, the two vertical step surfaces are an inner vertical step surface resting against the driving handle lateral plates and an outer vertical step surface resting again the support lateral plate, the transverse step surface is used for pivoting the driving handle assembly.

Preferably, each end of the eccentric shaft has a non-circular periphery, each support lateral plate of the support assembly has a non-circular hole for receiving the end of the eccentric shaft, the support plate prevents rotation of the eccentric shaft.

Preferably, each end of the top shaft has a non-circular periphery, each driving handle lateral plate has a non-circular hole for receiving the end of the top shaft, the driving handle lateral plate prevents rotation of the top shaft.

The plurality of connecting shafts disposed between the two support lateral plates include: a first round shaft rotatably located at the front side of the two support lateral plates; a second round shaft and a third round shaft both rotatably located at the rear side of the two support lateral plates; the short band is wound onto the first round shaft.

Preferably, the fixed plate has a tongue extending downward, for clamping of the spring.

When the tensioning device is in use, when the driving handle assembly is shaken counterclockwise, it rotates through the eccentric shaft. When the driving handle assembly rotates to the top end of the support, there is large gap between the top shaft of the driving handle and the eccentric shaft, thus it is convenient for operators to pass woven tapes. After passing the woven tapes as required, the driving handle assembly is shaken clockwise to the tail of the support, and the woven tapes are tightened to fasten cargos. Now, the gap between the top shaft of the driving handle and the eccentric shaft is reduced, and the woven tapes are compressed; and the connecting barrier is clamped into the slots on the two support lateral plates, so that the purpose of anti-slip safety tensioning can be achieved.

Compared with the prior art, the present invention has the following advantages: in the present invention, a driving handle assembly and a support assembly are connected through an eccentric shaft for connecting bands, and the size of the gap between the top shaft of the driving handle assembly and the eccentric shaft is changed by the unfolding or folding of the driving handle assembly, so that the bands passing the gap are loosened or compressed. Therefore, the present invention is simple and reasonable in structure and convenient in operation, so that the loosening of cargos can be avoided efficiently during transportation and the transportation safety of cargos is greatly improved.

DETAILED DESCRIPTION OF THE PREFERRED EMBODIMENT

Figure 1:
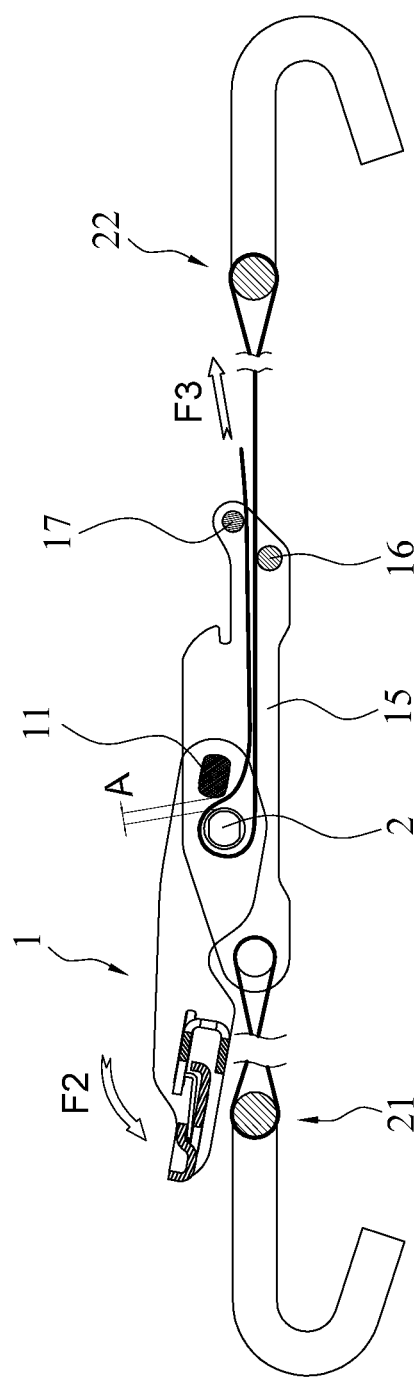
FIG. 1 is a schematic diagram of an anti-slip safety tensioning device for automobile according to an embodiment of the present invention (when a driving handle assembly is unfolded)

To enable a further understanding of the present invention content of the invention herein, refer to the detailed description of the invention and the accompanying drawings below:

FIG. 1-FIG. 5 show a preferred embodiment of an anti-slip safety tensioning device for automobile of the present invention. The tensioning device comprises a driving handle assembly 1, a support assembly 3, a long band 22 and a short band 21.

The driving handle assembly 1 is rotatable relative to the support assembly 3 to realize unfolding and folding; the driving handle assembly 1 mainly comprises a pair of driving handle lateral plates 4, a top shaft 11 and a barrier assembly; the top shaft 11 and the barrier assembly are respectively connected to a front end and a rear end of the two driving handle lateral plates 4, to connect the two driving handle lateral plates 4; and non-circular holes are provided at front ends of the two driving handle lateral plates 4; while non-circular portions having a non-circular section are provided at two ends of the top shaft 11; by coordination and fixation of the non-circular holes of the two driving handle lateral plates 4 and the non-circular portions at the two ends of the top shaft 11, the rotation of the top shaft 11 relative to the two driving handle lateral plates 4 is limited.

The barrier assembly includes a connecting barrier 8, a spring 7 and a fixed plate 5. A connecting barrier slot 23 and a fixed plate slot 24 in which the connecting barrier 8 and the fixed plate 5 are clamped are sequentially provided on the tails of the two driving handle lateral plates 4; the tails of the two driving handle lateral plates 4 are connected and fixed through the fixed plate 5, and a downward-facing cut-tongue 6 for clamping the spring 7 is provided in the middle of the fixed plate 5. The connecting barrier 8 has two stopper portions 9 disposed at opposite sides thereof; after the connecting barrier 8 passes through the connecting barrier slot 23 of the two driving handle lateral plates 4, its overhung stopper portions 9 respectively fall on the two support lateral plates 15 of the support assembly; and slots 18 into which the stopper portions 9 are clamped are formed respectively on the two support lateral plates 15. In this way, when the driving handle is folded, the stopper portions 9 can be respectively clamped into the corresponding slots 18 for the purpose of locking. The spring 7 is clamped between the connecting barrier 8 and the cut-tongue 6 of the fixed plate, so that the spring 7 imparts a downward-facing force on the connecting barrier 8. Additionally, circular holes 10 for pivoting the eccentric shaft 2 are also respectively formed behind the non-circular holes, for mounting the top shafts 11, of the two driving handle lateral plates 4, and adjacent to the non-circular holes.

The support assembly 3 comprises a pair of support lateral plates 15, and the eccentric shaft 2 having two ends respectively inserted into the two support lateral plates 15, and a plurality of connecting shafts are disposed between the two support lateral plates 15. In this embodiment, the plurality of connecting shafts include a first round shaft 19, a second round shaft 16 and a third round shaft 17, wherein the second round shaft 16 and the third round shaft 17 are sequentially provided on the tails of the two support lateral plates 15, the second round shaft 16 fixes two support lateral plates 16, and the third round shaft 17 is freely rotatable. In this way, it is convenient for the drawing of the long band 22. The first round shaft 19 is rotatably located at the front side of the two support lateral plates 15, the short band 21 is wound onto the first round shaft 19. Non-circular holes 20 are formed in the middle parts of the two support lateral plates 15, so that the two support lateral plates 15 of the support assembly and two ends of the eccentric shaft 2 are coordinated and fixed respectively through the non-circular holes 20 and non-circular portions coordinated with the non-circular holes, to limit the rotation of the eccentric shaft 2.

The driving handle assembly 1 is located between the two support lateral plates 15 of the support assembly 3, and they are connected through the eccentric shaft 2. Each end of the eccentric shaft 2 is in non-circular shape, and has two steps defining two vertical step surfaces 12,13 and a transverse step surface 14 between the two vertical step surfaces 12, 13, the two vertical step surfaces 12,13 are an inner vertical step surface 12 resting against the driving handle lateral plates 4 and an outer vertical step surface 13 resting again the support lateral plate 15, the transverse step surface 14 is used for pivoting the driving handle assembly 1, to make the driving handle assembly 1 rotatable about the eccentric shaft 2.

The diameter of the circular holes 10 on the two driving handle lateral plates 4, for the eccentric shaft 2 to run through, is less than the size of a longitudinal section of an eccentric bulge 25 in the eccentric shaft 2, so that two sides (i.e., the step 12 on the inner side) of the eccentric bulge 25 are clamped between the two driving handle lateral plates 4 and the whole eccentric shaft 2 cannot slide out from the two driving handle lateral plates 4 accordingly.

Furthermore, when the driving handle assembly 1 is in the folded state, the eccentric shaft 2 is located on a rear side of the top shaft 11; and an eccentric bulge 25 is provided on the eccentric shaft 2 and faces a side of the top shaft 11. After the free end of the long band 22 passes between the second round shaft 16 and the third round shaft 17, it bypasses the eccentric shaft 2 and passes through the gap between the eccentric shaft 2 and the top shaft 11.

Figure 2:
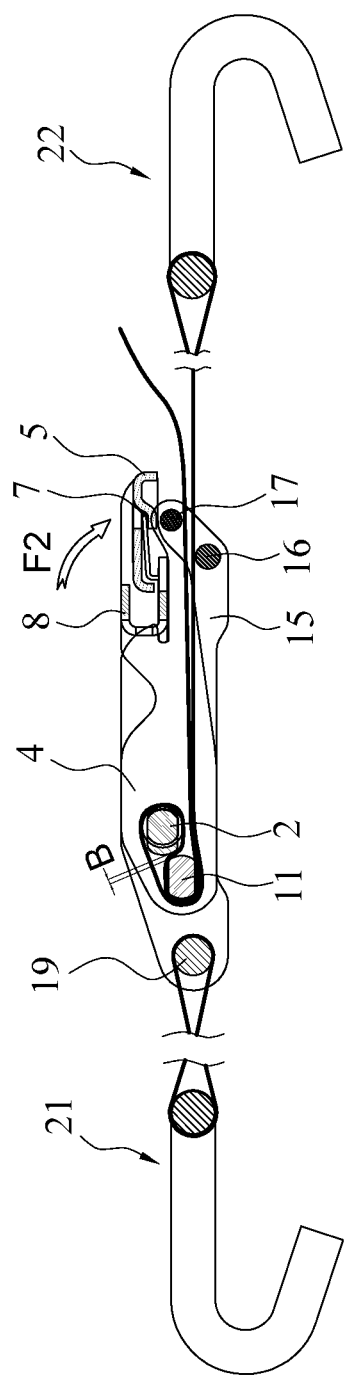
FIG. 2 is a schematic diagram of the anti-slip safety tensioning device according to the embodiment of the present invention (when the driving handle assembly is folded)
Figure 3:
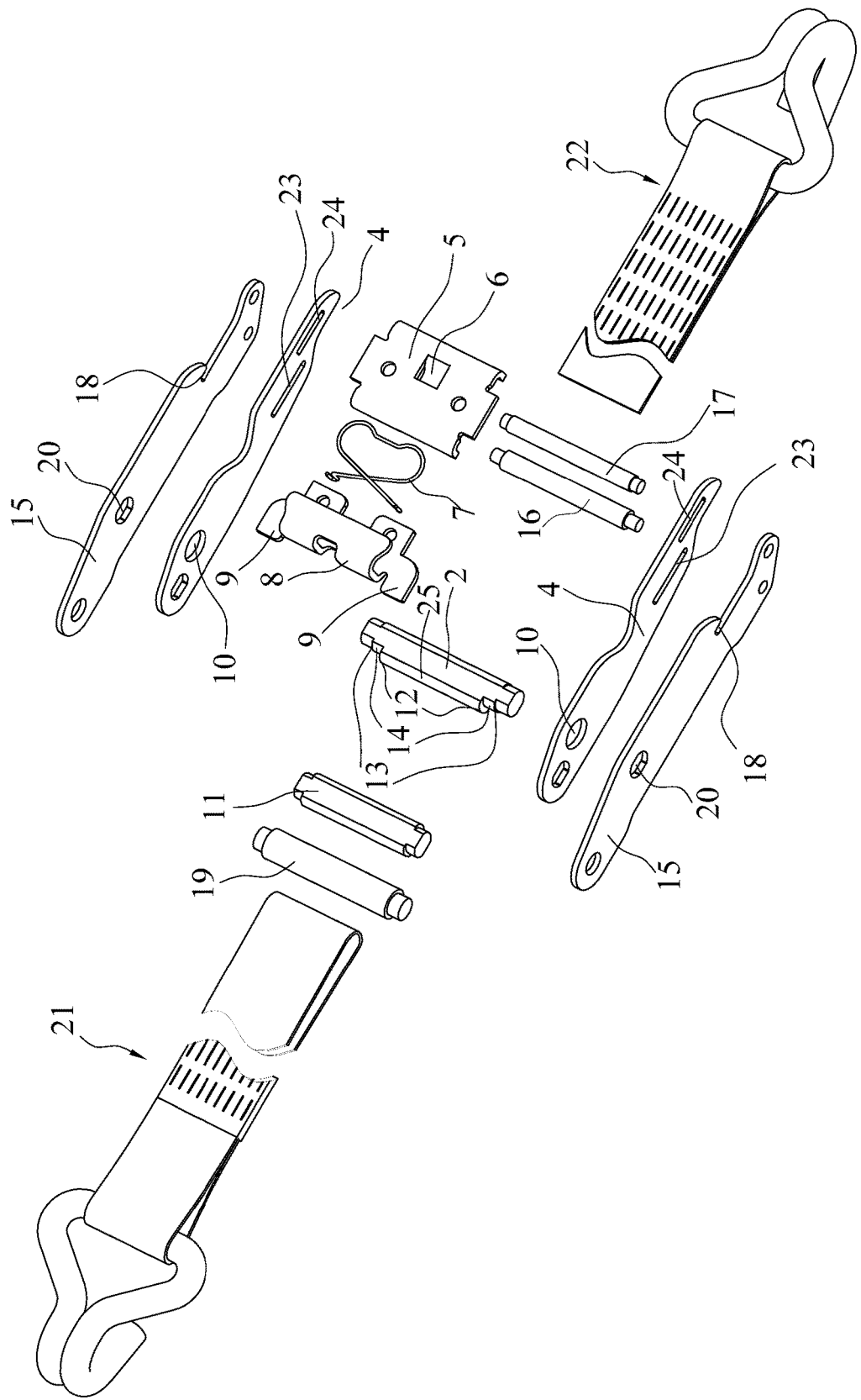
FIG. 3 is an exploded view of the anti-slip safety tensioning device according to the embodiment of the present invention.
Figure 4:
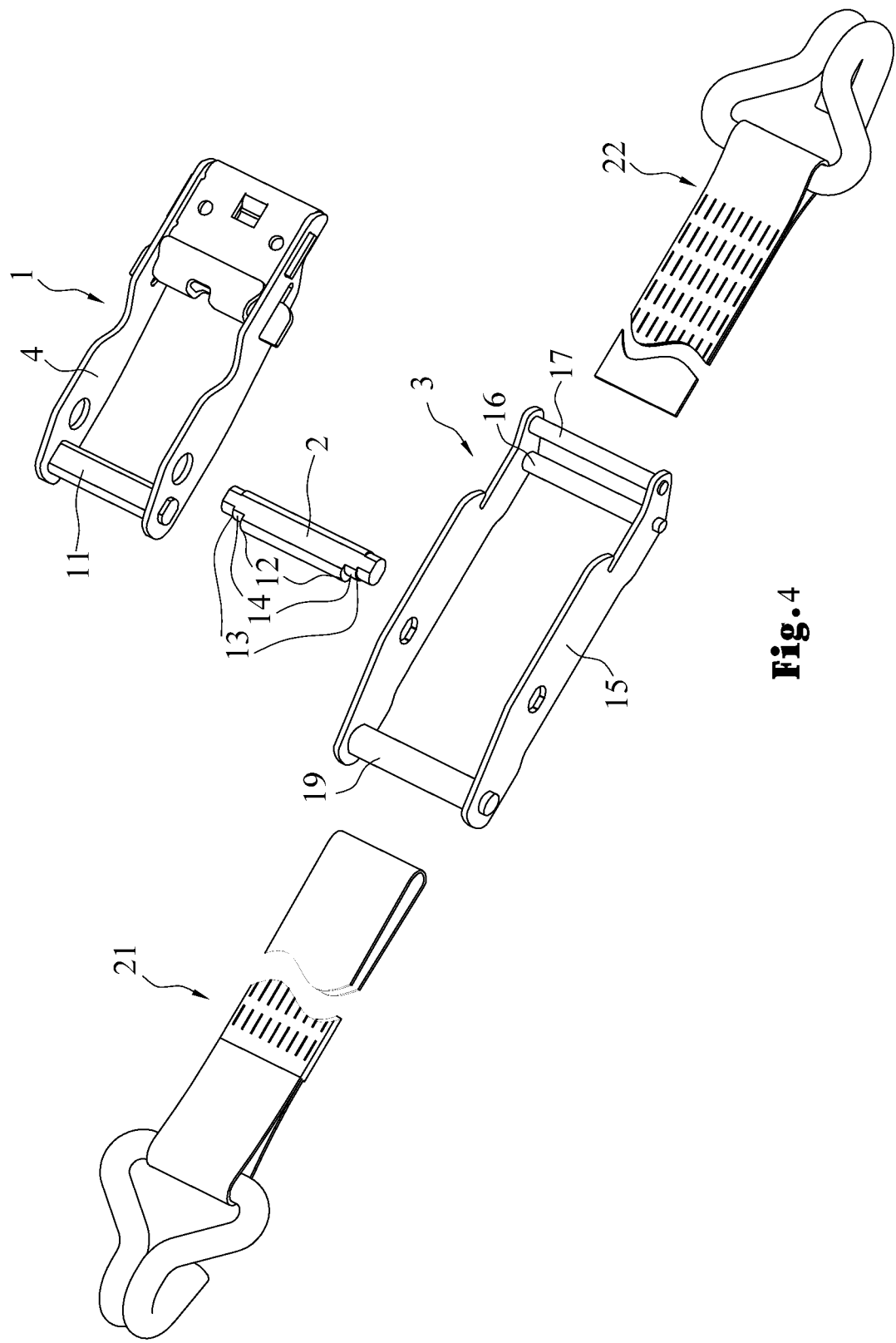
FIG. 4 is another exploded view of the anti-slip safety tensioning device according to the embodiment of the present invention.
Figure 5:
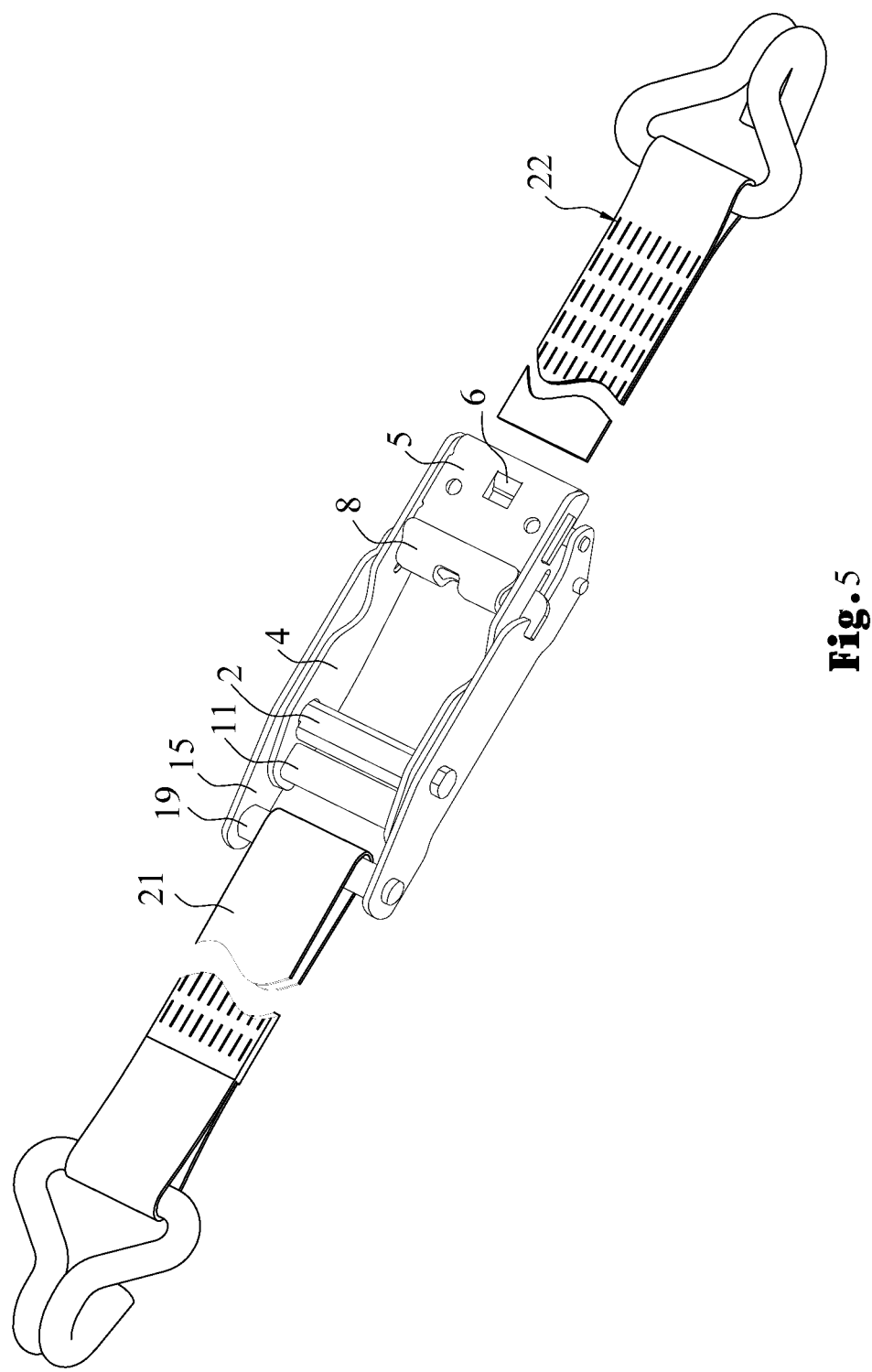
FIG. 5 is a perspective view of the anti-slip safety tensioning device according to the embodiment of the present invention.

As shown in FIG. 1 and FIG. 2, when the driving handle assembly 1 is shaken counterclockwise, it rotates about the smooth circumferential surface 14 of the eccentric shaft 2. When the driving handle assembly 1 rotates to the top end of the support assembly 3, there is a largest gap (as indicated by gap A of FIG. 1) between the top shaft 11 of the driving handle and the eccentric shaft 2. Thus, it is convenient for operators to pass the long band 22. After passing the woven tapes as required, the driving handle assembly 1 is shaken clockwise to the tail of the support assembly 3, and the woven tapes are tightened to fasten cargos. Meanwhile, the gap between the top shaft 11 of the driving handle assembly 1 and the eccentric shaft 2 is reduced (as indicated by gap B of FIG. 2), and the woven tapes are compressed (but not fully compressed) to lock the woven tapes, so that the anti-slip performance is improved. The connecting barrier 8 is camped into the connecting barrier slot 18 of the support lateral plates 15. In this way, anti-slip safety tensioning is realized.

The invention claimed is:

1. An anti-slip safety tensioning device for automobile, comprising a driving handle assembly, a support assembly, and a a first band and a second band;

wherein, the driving handle assembly is rotatable relative to the support assembly;

the support assembly comprises two support lateral plates, an eccentric shaft having an eccentric bulge and two ends respectively inserted into the two support lateral plates, and a plurality of connecting shafts disposed between the two support lateral plates;

the driving handle assembly comprises two driving handle lateral plates, a top shaft located at a front side of the driving handle assembly and between the two driving handle lateral plates, and a barrier assembly located at a rear side of the driving handle assembly and between the two driving handle lateral plates;

the driving handle assembly is located between the two support lateral plates, and the two ends of the eccentric shaft respectively pass through the two driving handle lateral plates enabling the driving handle assembly to be rotated around the eccentric shaft to achieve unfolding and folding of the driving handle assembly relative to the support assembly;

and when the driving handle assembly is folded relative to the support assembly, the eccentric shaft is located on a rear side of the top shaft and the eccentric bulge of the eccentric shaft faces the top shaft;

the first band being longer than the second band, the first band having a free end wrapped around the eccentric shaft, and the free end of the first band passes through a gap between the eccentric shaft and the top shaft.

2. The tensioning device of claim 1, wherein the barrier assembly includes a connecting barrier and a fixed plate disposed adjacent to each other and between the two driving handle lateral plates, and a spring disposed between the connecting barrier and the fixed plate;

the connecting barrier has two stopper portions disposed at opposite sides thereof, and correspondingly, each support lateral plate has a slot for receiving each stopper portion, the two stopper portions and the slots of the two support lateral plates form a locking mechanism between the connecting barrier and the two support lateral plates of the support assembly, when each stopper portion inserts into a corresponding slot, the driving handle assembly is locked with the support assembly.

3. The tensioning device of claim 1, wherein each end of the eccentric shaft has two steps defining two vertical step surfaces and a transverse step surface between the two vertical step surfaces, the two vertical step surfaces are an inner vertical step surface resting against the driving handle lateral plates and an outer vertical step surface resting against the support lateral plates, the transverse step surface is used for pivoting the driving handle assembly.

4. The tensioning device of claim 3, wherein each end of the eccentric shaft has a non-circular periphery, each support lateral plate of the support assembly has a non-circular hole for receiving the end of the eccentric shaft, the support plates prevent rotation of the eccentric shaft.

5. The tensioning device of claim 1, wherein each end of the top shaft has a non-circular periphery, each driving handle lateral plate has a non-circular hole for receiving the end of the top shaft, the driving handle lateral plates prevent rotation of the top shaft.

6. The tensioning device of claim 1, wherein the plurality of connecting shafts disposed between the two support lateral plates include: a first round shaft rotatably located at the front side of the two support lateral plates;

a second round shaft and a third round shaft both rotatably located at the rear side of the two support lateral plates; the short band is wound onto the first round shaft.

* * * * *